Sept. 28, 1948. R. P. McCULLOCH ET AL 2,450,150
PISTON FOR ROTARY ENGINES
Filed June 14, 1945 7 Sheets-Sheet 7
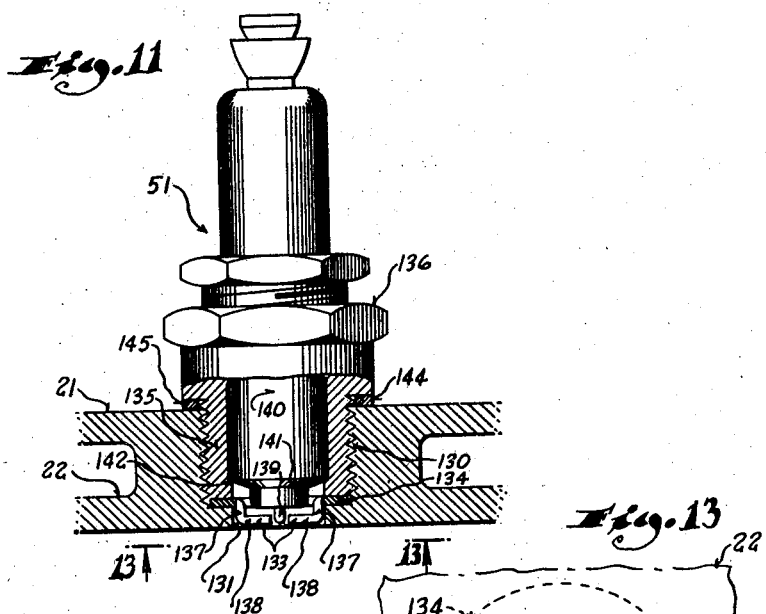
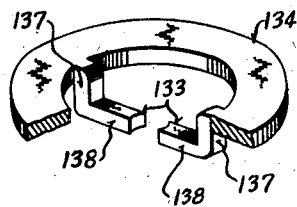
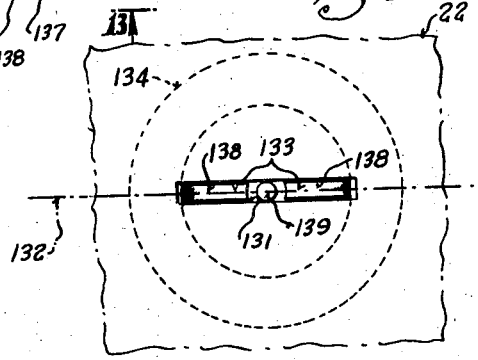
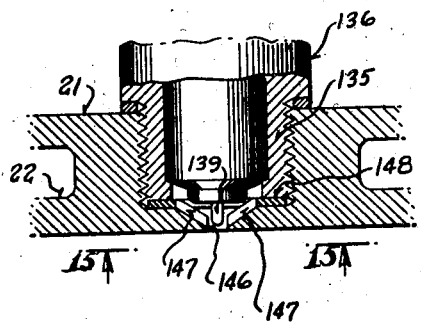
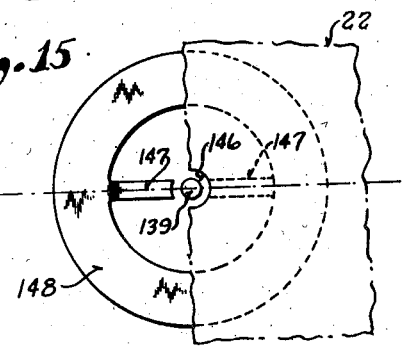

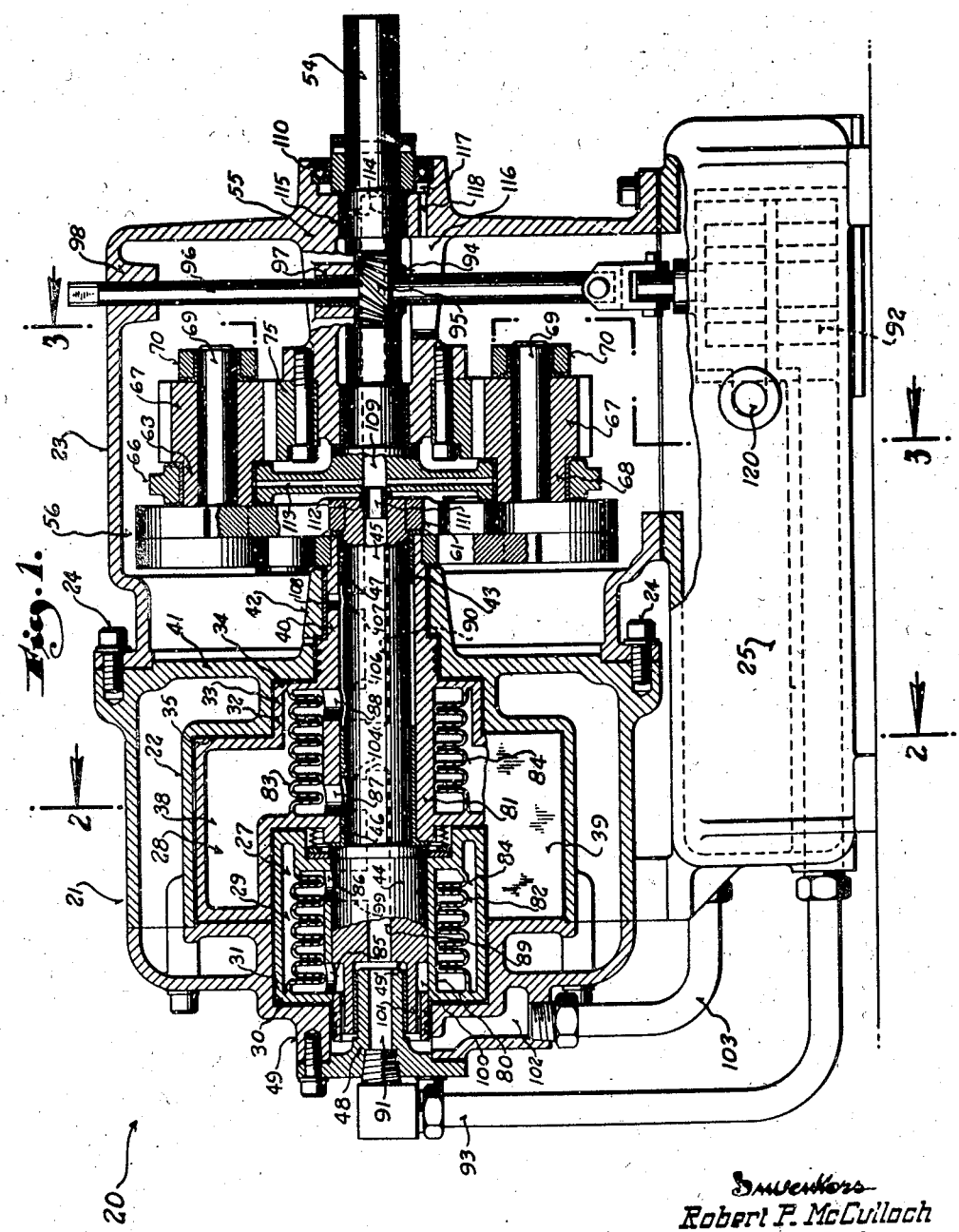

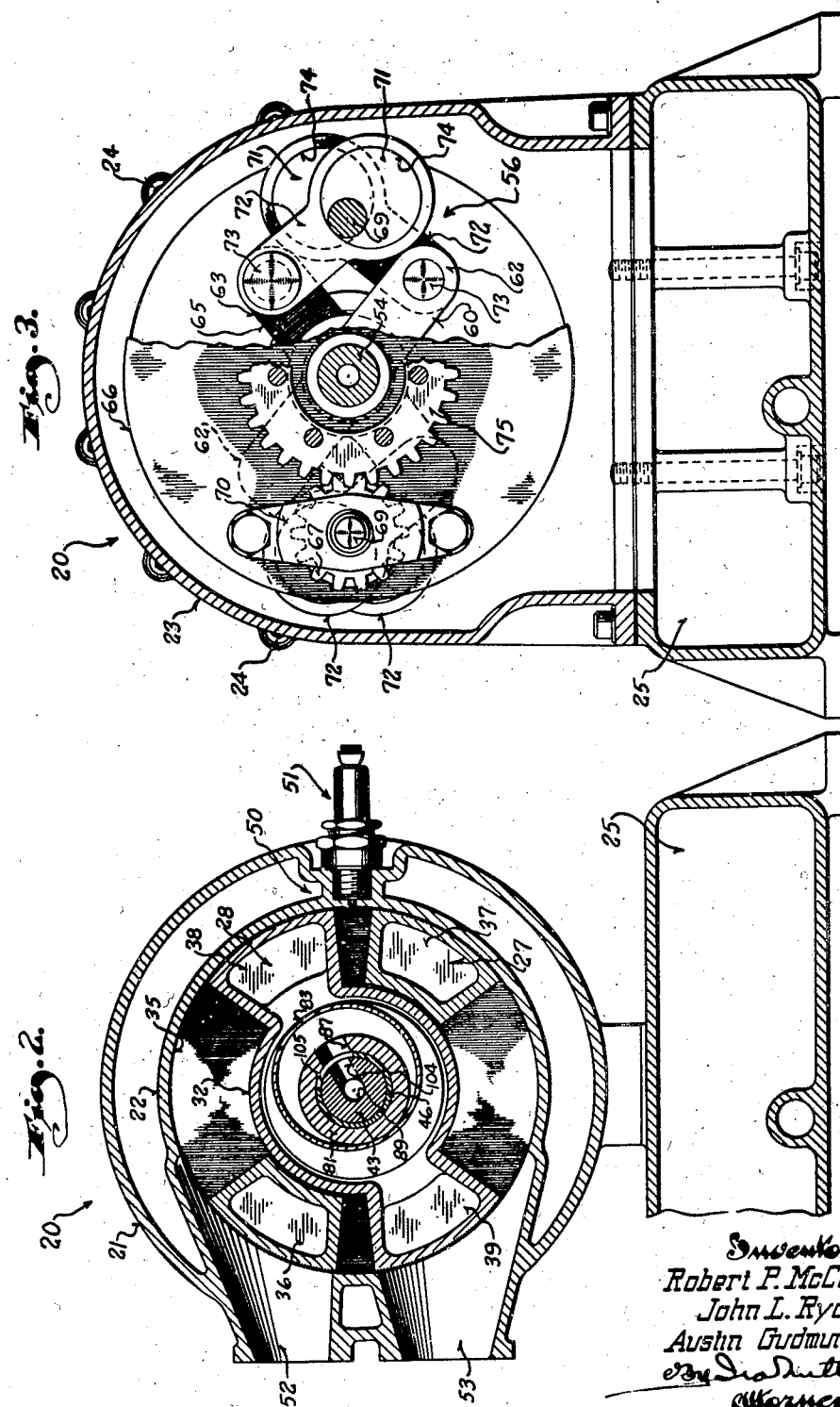

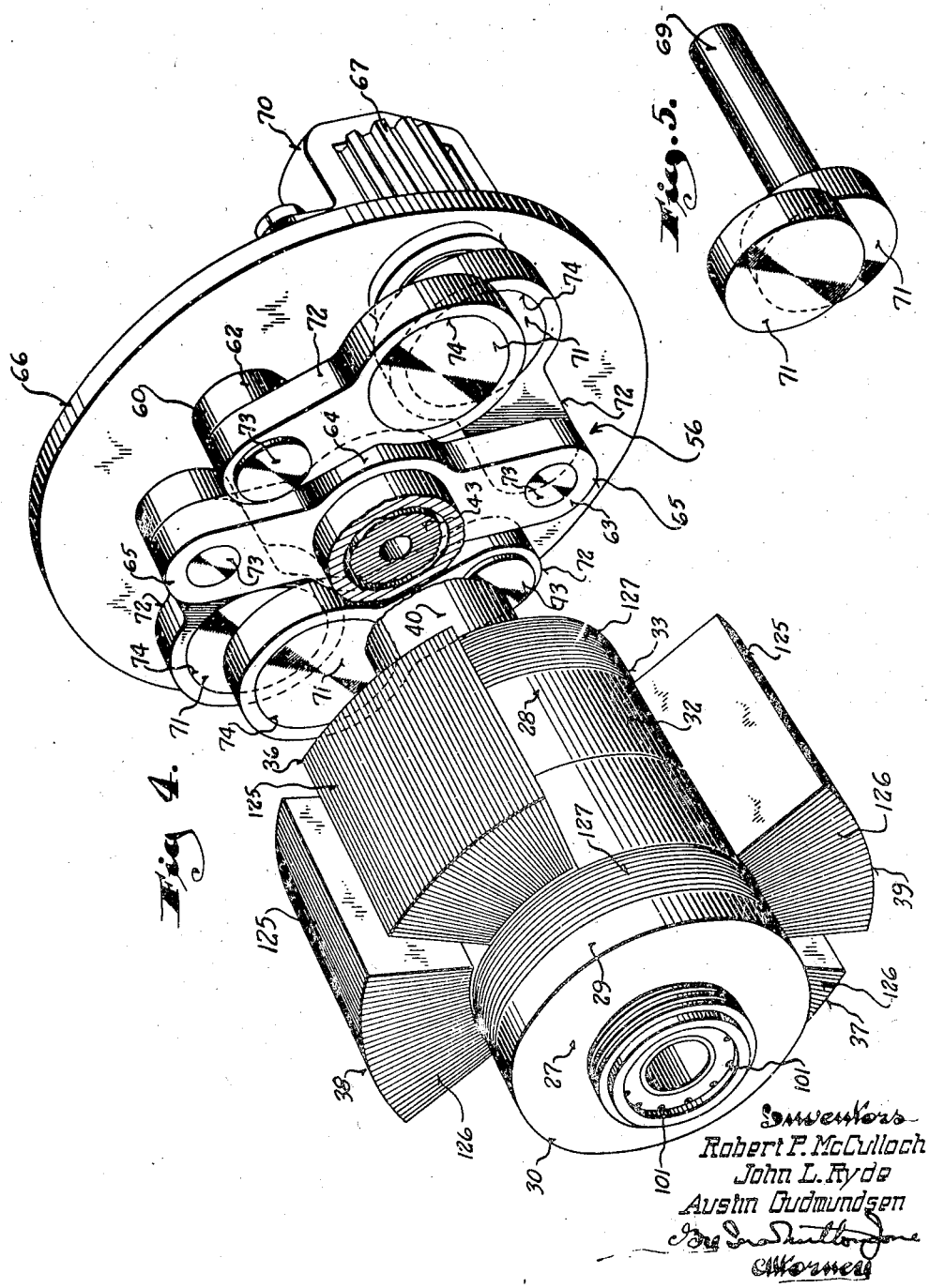

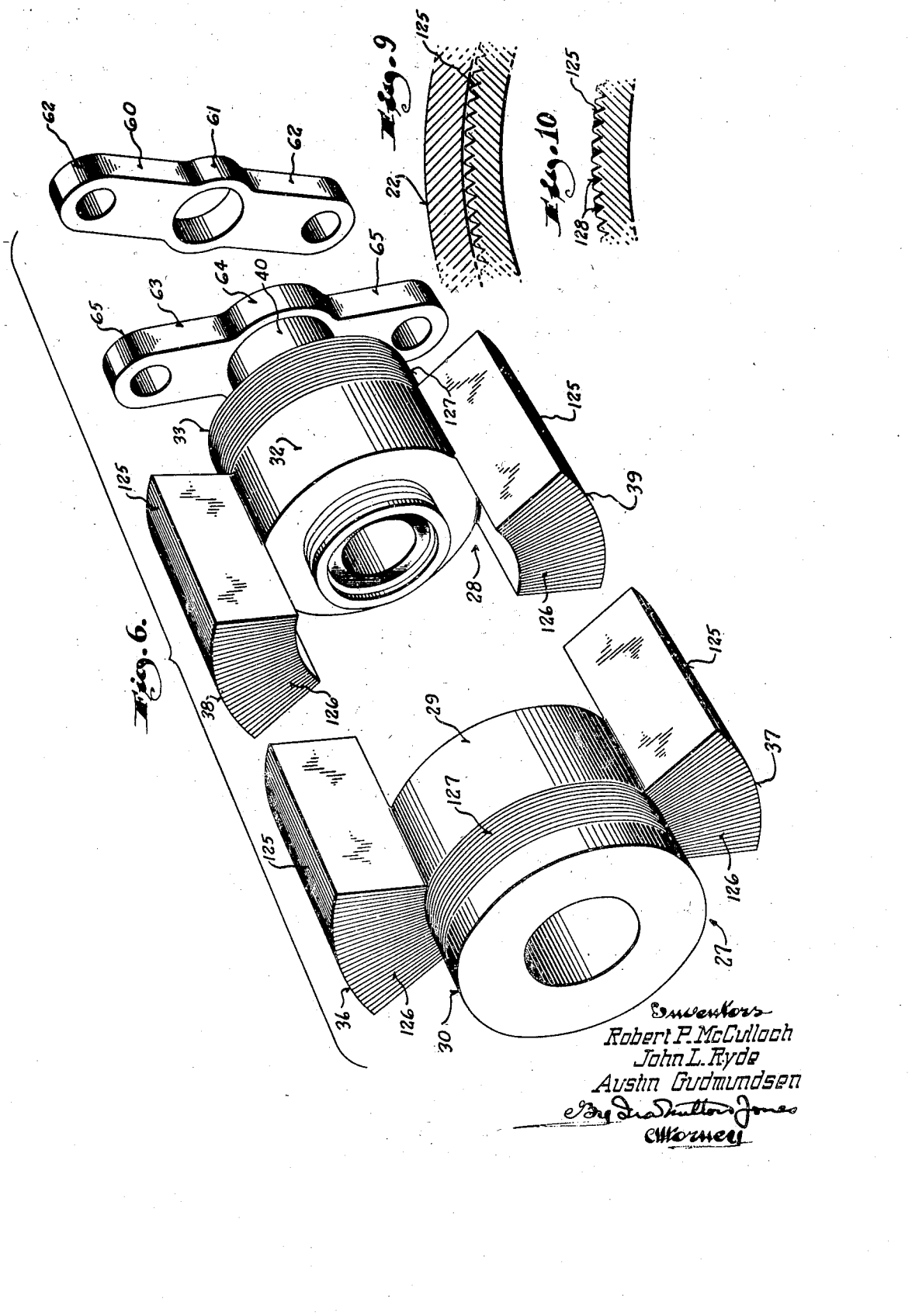

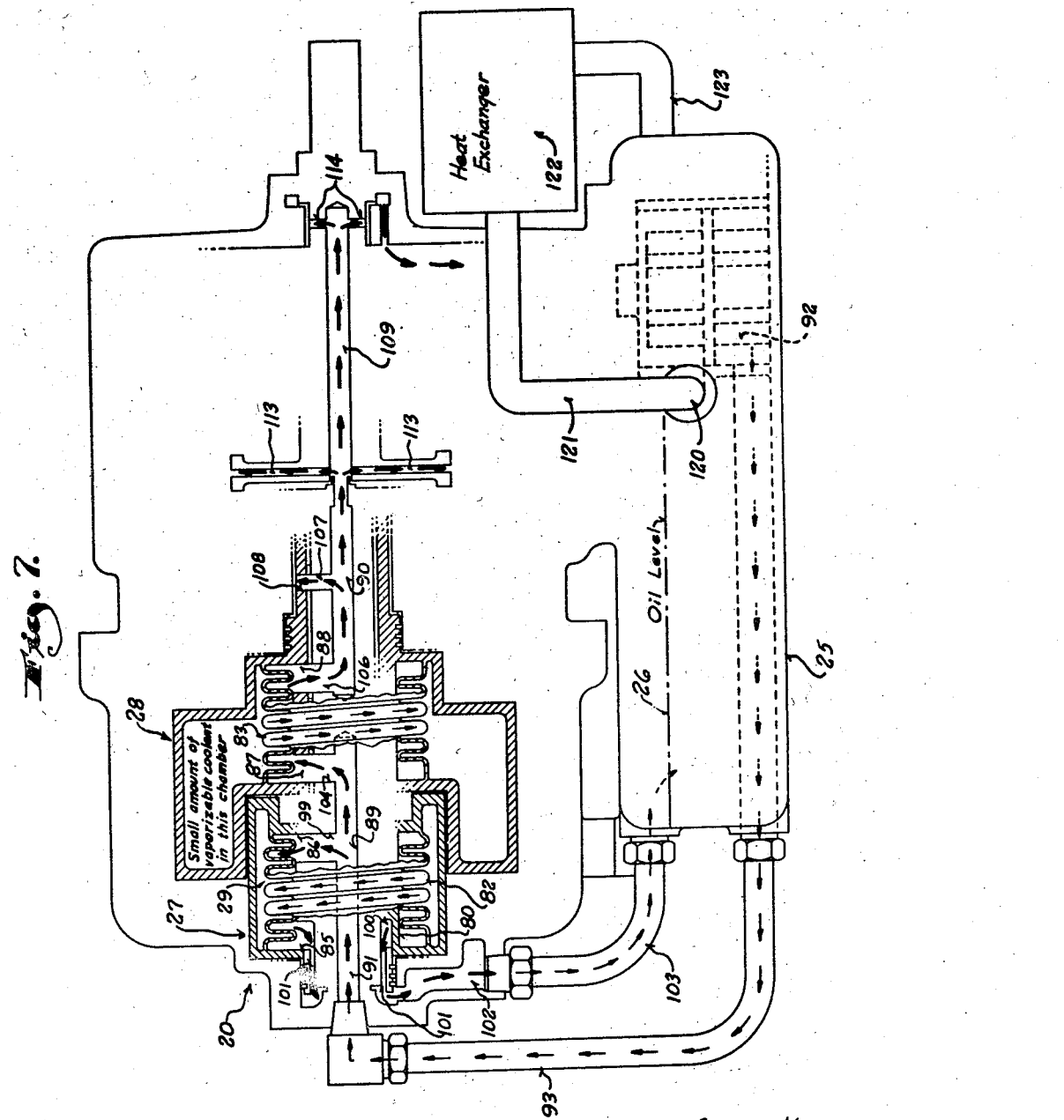

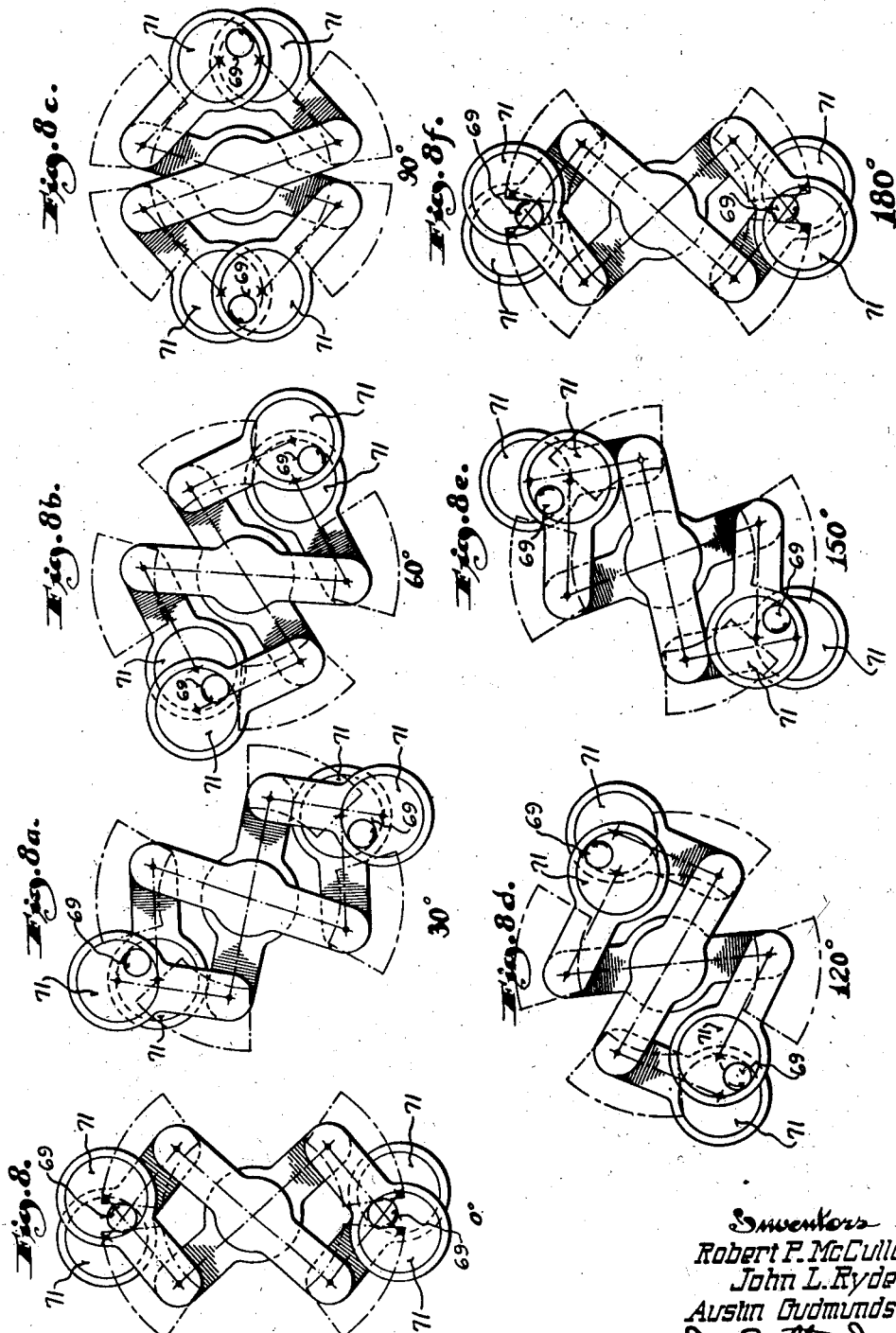

Patented Sept. 28, 1948

2,450,150

UNITED STATES PATENT OFFICE 2,450,150

PISTON FOR ROTARY ENGINES

Robert P. McCulloch, John L. Ryde, and Austin Gudmundsen, Milwaukee, Wis.; said Ryde and said Gudmundsen assignors to said McCulloch Application June 14, 1945, Serial No. 599,488

7 Claims. (Cl. 121—49)

This invention relates to internal combustion engines and has particular reference to internal combustion engines of the rotary type.

Engines of this general type are characterized by the provision of an annular cylinder having cooperating piston members rotatable therein about the axis of the cylinder which also defines the engine axis. In addition to being rotatable about the axis of their cylinder, these piston members are also mounted for angular motion relative to one another on the engine axis and it is this angular motion of the piston members relative to one another which is utilized to effect rotation of the driven shaft through some sort of drive transmission usually in the form of cam controlled parallelogram linkage. Such linkage also serves to govern the motion of the pistons relative to one another and to limit the extent of such relative motion therebetween.

Despite the features of compactness and high horsepower per unit of weight, rotary engines have not come into widespread use for a number of reasons, chief among which is the difficulty of eliminating vibration during operation of such engines. Vibration is particularly objectionable if the cooperating piston members are mounted directly on the driven shaft with one of them fixed thereto and with the other free to oscillate with respect to the fixed piston member as has been frequently proposed in the past.

In such cases the linkage acting as the drive transmission controls the piston members so that the fixed piston member on the drive shaft rotates at a uniform rate of speed during operation of the engine while the loose piston member not only rotates but rapidly oscillates about the engine axis relative to the fixed piston member in response to the successive explosions between adjacent pairs of pistons on the piston members. Thus, the loose piston is subject to violent alternate accelerating and decelerating motions during operation of the engine which result in high unbalanced inertia forces and excessive vibration.

It is one of the objects of this invention to improve the operation of rotary engines of the character described by neutralizing the inertia forces resulting from relative angular movement between the cooperating piston members thus producing balanced conditions of operation with little or no vibration.

More specifically it is an object of this invention to obtain balanced conditions of operation in a rotary engine of the character described by mounting the cooperating piston members for rotation about the engine axis and for relative angular motion of either with respect to the driven shaft of the engine, and to control relative angular motion between the piston members by means of an improved drive transmission connected between the piston members and the driven shaft.

It is another object of this invention to provide a rotary engine of the character described with an improved drive transmission operable to translate relative angular motion between the piston members into rotation of the driven shaft and to effect rotation of the piston members at an alternately accelerating and decelerating speed with the speed of one piston member accelerating simultaneously with deceleration of the other piston member and with equal rates of acceleration and deceleration during such angular relative motion therebetween.

Another object of the present invention is to provide a drive transmission connected between the pistons of a rotary engine and the driven shaft thereof which includes epicyclic gearing, the movable gears of which are carried by the driven member.

A further object of this invention is to provide a rotary engine with a drive transmission of the character described by which the piston members each apply a turning moment of the same magnitude on each of the movable gears of said epicyclic train upon angular motion of the piston members relative to one another.

Still another object of this invention resides in the provision of novel means for effecting cooling of the pistons during rotation thereof in their cylinder.

A still further object of the present invention resides in the provision of improved sealing means for the pistons for preventing the escape of combustion gases therepast.

Another object of this invention is to provide novel means for igniting the combustible mixture contained in the spaces between adjacent pistons as such spaces are successively presented to a fixed firing position.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a longitudinal cross sectional view through the rotary engine of this invention;

Figure 2 is a cross sectional view through the cylinder of the engine taken on the plane of the line 2—2 of Figure 1;

Figure 3 is a cross sectional view illustrating a portion of the drive transmission, taken through Figure 1 on the plane of the line 3—3;

Figure 4 is a perspective view illustrating the manner in which the drive transmission of this invention is connected between the piston members and the driven member to transmit driving torque thereto in consequence to angular motion of the piston members relative to one another;

Figure 5 is a perspective view of a crank pin having a pair of eccentric cranks connected thereto and which forms part of the drive transmission;

Figure 6 is a perspective view of the cooperating piston members and their respective drive levers showing the same separated to better illustrate their association with each other;

Figure 7 is a diagrammatic view illustrating the manner of effecting lubrication of the moving parts of the engine as well as cooling of the piston members;

Figures 8 to 8f, inclusive, are diagrammatic views serving to illustrate the manner in which oscillation of the drive levers by the pistons is translated into rotation of the crank pins and hence the movable elements of the epicyclic train;

Figure 9 is a cross sectional view through a portion of one of the pistons and the cylinder wall adjacent thereto illustrating the seal therebetween;

Figure 10 is a view similar to Figure 9 illustrating a slightly modified embodiment in which the sealing means per se may also be employed to provide lubrication between the adjacent surfaces of the pistons and the cylinder wall;

Figure 11 is a view partly in section and partly in elevation illustrating the manner in which spark for the cylinder is provided;

Figure 12 is a perspective view of a ground electrode forming part of a novel spark plug for the engine;

Figure 13 is a view taken on the plane of the line 13—13 of Figure 11;

Figure 14 is a view similar to Figure 11 illustrating a slightly modified form of ground electrode; and Figure 15 is a view taken on the plane of the line 15—15 of Figure 14.

Referring now more particularly to the accompanying drawings in which like numerals indicate like parts, the numeral 20 generally designates the rotary engine of this invention. The engine comprises a cylinder head 21 provided with an annular cylinder 22 therein spaced from the wall of the cylinder head to provide a water jacket therebetween, and a transmission housing 23 connected axially to one end of the cylinder head as by screws 24. The connected cylinder head and transmission housing are mounted on a hollow base 25 which provides a reservoir for a supply of lubricating oil 26, it being noted that the interiors of the reservoir and transmission housing are communicated with each other through openings in their top and bottom walls respectively.

Rotatable within the cylinder 22 about its axis hereinafter referred to as the engine axis is a pair of cooperating piston members 27 and 28.

The piston member 27 has a cylindrical hub 29, a portion 30 of which is rotatably received in an annular axially offset pocket 31 in one side wall of the cylinder, while the piston member 28 has a similar hub 32 axially alongside the hub 29 provided with a portion 33 which projects into a similar annular axially offset pocket 34 in the opposite side wall of the cylinder. The pockets 31 and 34 are approximately of the same diameter but smaller than the central portion 35 of the cylinder therebetween.

Diametrically opposite sector-like pistons 36 and 37 on the piston member 27, and 38 and 39 on the piston member 28 project radially outwardly from the hubs 29 and 32 into the central portion 35 of the cylinder for rotation therein, with the pistons of one piston member circumferentially interposed between the pistons of the other member. As will be apparent from Figures 4 and 6, the pistons overhang the adjacent ends of the hubs 29 and 32 so that all of the pistons align axially with each other in the central portion 35 of the cylinder.

The piston member 28 has a tubular extension 40 which projects outwardly of its hub 32 through the adjacent end wall 41 of the cylinder head and into the transmission housing 23, to be rotatably received in a bushed bearing 42 carried by said end wall of the cylinder head. Both of the piston members, however, are mounted on a common piston shaft 43 extending longitudinally through the cylinder on the engine axis. The hub 29 of the piston member 27 is fixed on an enlarged end portion 44 of the shaft so that the piston member 27 rotates therewith, while the hub 32 of the piston member 28 is rotatably received on the opposite small diameter portion 45 of the shaft by means of axially spaced bushings 46 and 47 pressed into the hub from its opposite ends.

In this manner, the tubular extension 40 of the hub 32 serves to rotatably support one end of the shaft 43, the opposite end 44 of the shaft being rotatably supported by means of a bushed pilot bearing 48 carried by an axial neck 49 at the outer end of the cylinder head, which bearing enters a bore 49' in the adjacent end of the shaft.

The piston shaft 43 thus mounts the piston members for rotation in their cylinders and for oscillation of one relative to the other so that the spaces between adjacent cooperating pistons may be successively presented to a fixed firing zone 50 at which a spark plug generally designated by the numeral 51 is located to ignite a charge of combustible mixture between such pistons.

To provide for introducing a combustible mixture to the spaces between cooperating pistons on the piston members and to exhaust burnt gases from such spaces, the cylinder 22 is provided with the customary intake and exhaust ports 52 and 53 respectively as illustrated in Figure 2.

The relative rotation between the piston members effected upon firing of the engine is translated into rotation of a driven shaft 54 separate from the piston shaft 43 and supported by a bearing structure 55 on the end wall of the transmission housing 23 for rotation on an axis in alignment with the piston shaft so as to be rotatable on the engine axis, by means of a novel drive transmission 56 contained within the transmission housing 23.

It is the purpose of the drive transmission 56 to also control the angular movements of the piston members relative to one another so as to present the same with the proper spacing therebetween to the ports 52 and 53 and to the spark plug 51 during their rotation in the cylinder, and to effect a balance of the inertia forces of the pistons resulting from successive firing of the engine 20.

For these purposes each of the piston members has a drive lever connected therewith so as to rotate with the pistons on the engine axis and to oscillate relative to one another upon relative angular motion between the piston members. One of these levers 60 is fixed to the piston shaft 43 at the end thereof which projects into the transmission housing to rotate with the piston member 27. The lever 60 has a central portion 61 bored to receive the shaft and opposite radially extending arms 62 substantially aligning with the sector-like pistons 36 and 37 on the piston member 27.

The other lever 63 has a central portion 64 bored to receive the end of the tubular extension 40 which projects into the transmission housing through the bearing 42 and to which it is fixed so as to rotate with the piston member 28. The lever 63 likewise has opposite radially extending arms 65 substantially in angular alignment with the sector-like pistons 38 and 39 on the piston member 28.

The drive levers 60 and 63 are parallel and lie axially adjacent to each other and to the face of a flange 66 carried by the inner end of the driven shaft 54. In the present instance, the flange 66 is shown as an integral part of the shaft 54 but it will be understood that it may be comprised of a separate disc or plate keyed or otherwise secured to the driven shaft to rotate therewith in a plane normal to the engine axis.

Diametrically opposite planet gears 67 on the side of the flange opposite the drive levers have hubs 68 rotatably received in suitable bearings in the flange 66 equidistant from the engine axis, and these planet gears are drivingly received on crank pins 69 which extend centrally through the gears to have their ends remote from the flange rotatably journalled in bearings 70 carried by the flange as clearly shown in Figure 3. The crank pins 69 thus revolve with the driven shaft 54 but are rotatable on axes parallel to the engine axis.

The crank pins 69 extend through the flange 66 and each has a pair of cranks 71 fixed thereto at the side of the flange adjacent to the drive levers 60 and 63, with each of the cranks having the same degree of eccentricity. The cranks 71 are substantially in the form of a disc and are connected with the ends of the arms 62 and 65 by means of links 72. For this purpose one end of each link and the end of the arm to which it connects is apertured to receive a pivot pin 73 while the opposite end of the link is enlarged and bored as at 74 to rotatably receive one of the eccentric crank discs 71.

Attention is directed to the fact that all of the links 72 are of the same length and that their points of connection 73 with the arms are equidistant from the engine axis. Hence, inasmuch as the eccentric crank discs 71 each have the same degree of eccentricity, it follows that relative angular movement between the piston members in response to an explosion between adjacent cooperating pistons thereon is transmitted into a pair of equal turning moments on each of the crank pins 69 to effect rotation of the same and the planet gears thereon in one direction.

Each of the planet gears 67 meshes with a common sun gear 75 carried by the bearing structure 55 in fixed relationship to the driven shaft 54 and to its flange 66. Hence, rotation of the planet gears 67 is translated into rotation of the driven shaft 54 by the meshing engagement of the planet gears with the sun gear 75.

The manner in which the piston members exert individual but equal turning moments on the crank pins is clearly brought out in diagrammatic manner in Figures 8 to 8f, inclusive, which depict the extent of relative angular motion between the piston members and rotation of the crank pins for each 30 degrees of rotation of the driven shaft starting from a firing position in Figure 8 comparable to that illustrated in Figure 2 and including a second firing position in Figure 8c at which the driven shaft has been rotated 90 degrees, and carrying to a third firing position in Figure 8f at which the driven shaft has been rotated 180 degrees.

Referring to Figure 8, it will be seen that when an explosion between adjacent cooperating pistons on the piston members takes place the piston members will be caused to move angularly in opposite directions (see Figures 8a and 8b) and at the same rate of movement by means of the connection between their drive levers and the eccentric discs 71. This movement of the piston members has the effect of causing simultaneous movement of the levers in scissors fashion in a direction tending to bring their longitudinal axes in alignment on a horizontal plane with reference to Figure 8.

Such motion of the drive levers in scissors fashion is translated into separate turning moments of equal magnitude on the crank pins 69 through the links and the eccentric discs 71 with the result that the crank pins rotate and in turn effect rotation of the planet gears 67 and hence the driven shaft 54.

It is particularly important to note that relative angular motion between the piston members in response to an explosion between adjacent cooperating pistons thereon is not only translated into rotation of the driven shaft 54, but that the connection between the piston members and the eccentric cranks 71 is such as to effect simultaneous rotation of both piston members with the driven shaft 54 while at the same time effecting acceleration of one piston member simultaneous with deceleration of the other; and that port and spark timing, or presentation of adjacent pistons to the intake and exhaust ports 52 and 53 respectively and to the spark plug 51 with the proper angular disposition of the pistons at each of these areas of the cylinder is also obtained.

Each of the piston members is, therefore, caused to rotate not only with the driven shaft but relatively thereto, inasmuch as it is caused to rotate with an alternate accelerating and decelerating motion with simultaneous and alternating decelerating and accelerating motions of its cooperating piston member.

This particular manner of controlling the rotational and relative angular movements of the piston members about the engine axis effects a balance of the inertia forces resulting from the response of the piston members to an explosion between adjacent cooperating pistons thereon and thus largely eliminates vibration which has been extremely objectionable in past rotary engines.

Inasmuch as the pistons of rotary engines become extremely hot during operation, this invention also proposes novel means for cooling the same. For this purpose, each of the piston members 27 and 28 is of hollow construction as shown in Figures 1 and 2, with the hollow interiors of the pistons communicating with the hollow interiors of their hubs.

A cylindrical wall 80 on the hub 29 at its bore encircles the portion 44 of the piston shaft while a similar cylindrical wall 81 on the hub 32 forming an inner part of the tubular extension 40 encircles the bushing 46 on the section 45 of the piston shaft.

Circumferential walls 82 and 83 inside the hollow hubs 29 and 32, respectively, of relatively thin metal and formed of helical convolutions 84 cooperate with the cylindrical walls 80 and 81 to define helical passageways extending axially between the ends of the hubs. The opposite ends of the helical passageway in the hub 29 are communicated with the bore thereof through apertures 85 and 86 in the cylindrical wall 80, while the opposite ends of the helical passageway in the hub 32 are communicated with the bore thereof through apertures 87 and 88 in the cylindrical wall 81.

The circumferential walls 82 and 83 defined by the helical convolutions are imperforate and act to seal a small quantity of vaporizable coolant such as water within the hollow interiors of the piston members, and upon which the circumferential walls exert a cooling influence when a cooling medium such as oil is circulated through the helical passageways.

In order to effect circulation of oil through the passageways, the piston shaft 43 is provided with separate central ducts 89 and 90 extending inwardly from opposite ends of the shaft with the duct 89 aligning with a similar duct 91 extending centrally through the pilot bearing 47 and connecting with the outlet of a pump 92 in the oil reservoir 25 through a supply line 93.

The pump is operated from the driven shaft 54 by means of a gear 94 thereon meshing with a gear 95 on a vertically extending pump shaft 96 journalled in spaced bearings 97 and 98 on the bearing structure 55 and the top of the transmission housing respectively.

During operation of the engine the pump 92 forces oil through the supply line 93 and the duct 91 and into the duct 89 in the piston shaft. The duct 89 is communicated with the inlet of the helical passageway within the hub 29 by means of a radial branch 99 of the duct 89 aligning with the aperture 86 in the cylindrical wall 80.

The portion 44 of the piston shaft opposite the aperture 85 is provided with an annular groove 100 in its periphery to receive oil circulated through the passageway in the hub 29, and a number of longitudinal holes 101 leading from this groove 100 to the end of the shaft adjacent to the pilot bearing 47 discharge the oil into the space within the neck 49 surrounding the end 44 of the shaft. As previously stated, this space is closed by the pilot bearing 48 and oil discharged thereinto is returned to the oil reservoir 25 by a downwardly extending passageway 102 in the neck and an oil line 103 connected therewith.

Hence, it will be seen that coolant, in the present instance oil, is pumped from the reservoir through the ducts 91 and 89 and through the branch 99 in the piston shaft into one end of the helical passageway within the hub 29 and discharges from the opposite end of the helical passageway into the groove 100 from whence it is returned to the reservoir through the longitudinal apertures 101, the passageway 102, and the duct 103.

Lubricant from the duct 89 of the piston shaft is also supplied to the inlet of the passageway in the hub 32 of the piston member 28 through a radial branch 104 of the duct 89 which aligns with the aperture 87 in the cylindrical wall 81, an annular slot 105 in the bushing 46 being provided so as to insure communication between the branch 104 and the aperture 87 despite oscillation of the piston member 28 about the axis of the piston shaft.

Hence, lubricant enters the inlet of the helical passageway in the hub 32 to traverse its length and is discharged through the aperture 88 in the cylindrical wall 81 into the duct 90 through a radial branch 106 thereof.

Another radial branch 107 of the duct 89 supplies such discharged lubricant to the bushing carried by the bearing 42 through an aperture 108 in the tubular extension 40. The lubricant circulated through the passageway in the hub 32 also supplies the bushings 46 and 47 as will be obvious.

The duct 90 in the piston shaft also connects with a duct 109 extending centrally into the driven shaft 54 from the flange end thereof and terminating adjacent to a ball bearing 110 carried by the bearing structure 55 exteriorly of the transmission housing.

To insure transfer of lubricant from the duct 90 to the duct 109 a bushing 111 common to both ducts is provided. This bushing fits inside the duct 90 and has a flange 112 confined between the end of the piston shaft and the adjacent end of the driven shaft. Radial passages 113 in the flange connect the duct 109 with the bushed bearings for the planet gears 67 to insure adequate lubrication therefor, and other radial passages 114 lead from the duct 109 to supply lubricant to a bushing 115 carried by the bearing structure 55 adjacent to the ball bearing 110 but on the transmission side thereof.

Lubricant circulated through the helical passageway in the hub 32 thus is returned to the reservoir 25 by means of the ducts 90 and 109 and by the escape of lubricant past the planet gear bearings and the bushing 115, it being understood that the bearing structure 55 is open at its bottom as at 116 inwardly of the bushing 115 to permit lubricant to drop directly into the reservoir through the aligned openings in the bottom of the transmission housing and the top of the reservoir 25.

Lubricant flowing past the bushing 115 outwardly of the driven shaft is caught in an annular space 117 between the bushing and the ball bearing 110, which space is communicated with the interior of the transmission housing through an aperture 118 in the wall of the bearing structure 55. Hence, a supply of lubricant is at all times available for the ball bearing 110.

The oil pump has a second outlet 120 which is connected through a pipe 121 with the inlet of a heat exchanger 122 the outlet of which leads back to the reservoir 25 through a pipe 123. Hence, it will be seen that during operation of the engine, the pump continuously circulates oil from the reservoir through the heat exchanger to cool the same, and that such cooled oil is continuously circulated through the helical passageways in the hubs 29 and 32 of the piston members to cool the thin helical walls thereof.

The surfaces of the piston which ordinarily become heated to an excessive degree during operation of the engine act to effect vaporization of the coolant sealed within the hollow piston members, and such vaporized coolant is condensed by its contact with the oil cooled helical walls of the passageways. The condensed coolant is thrown outwardly by centrifugal force from the helical walls of the passageways and impinges the heated walls of the pistons to again become vaporized but to exert a desirable cooling effect thereon. Such vaporization and condensation of the coolant sealed within the piston members is, of course, carried out in endless fashion and takes place more or less cyclically during operation of the engine.

Inasmuch as the cylinder walls themselves are cooled by circulation of a cooling medium such as water through the water jacket space between the cylinder walls and the cylinder head, it follows that the cooling of the pistons in the manner described entirely eliminates the danger of overheating which was heretofore one of the most serious objections to past rotary engines.

The present invention also provides novel means for sealing the pistons in their cylinder to prevent the escape of gases therepast during operation of the engine. The sealing means is clearly shown in Figures 2, 4, 6, and 9, and consists in the provision of closely spaced longitudinally extending grooves 125 in the outer cylindrical surfaces of the pistons, similar radially extending grooves 126 on the end walls of the sector shaped pistons, and closely spaced concentric circumferential grooves 127 on the outer cylindrical surfaces of the hubs 29 and 32 at their portions which project into the annular offset pockets 31 and 34 of the cylinder 22.

The grooves 125 and 126 lie crosswise to the direction in which gases tend to escape past the sector-like lobes forming the pistons per se while the spaced circumferential grooves 127 lie crosswise of the path of gases tending to flow in an axially outward direction from the pistons toward the annular offset pockets 31 and 34.

As clearly shown in Figure 9, which illustrates a portion of the cylindrical outer surface of one of the pistons and the section of cylinder wall adjacent thereto, the grooves are seen to be substantially V-shaped in cross section. Communication between adjacent grooves is restricted to the very slight spaces between the peaks separating adjacent grooves and the adjacent inner wall of the cylinder. These slight spaces act to effect progressive reduction of the pressure of any gases attempting to escape past the pistons until the force of such gases is expended in the labyrinth-like succession of grooves.

Attention is directed to the fact that the peaks of the V-shaped grooves present a minimum area of the piston members for contact with the cylinder walls. This is a highly desirable feature of this invention inasmuch as it permits the piston members to be quickly lapped into their cylinders to thereby obtain the best possible rotating fit without danger of gouging or scoring of either the cylinder or piston walls during the lapping operation.

Inasmuch as the labyrinth-like seal for the piston members obviates the necessity for the conventional sealing strips on the pistons, both the piston members and their cylinders are preferably formed of aluminum or any of the light weight alloys which hitherto could not be used because of their softness. The use of light weight metals of this type desirably lightens the rotary engine of this invention.

If desired, some of the grooves of the labyrinth-like seal for the pistons may be filled with a non-carbonizing lubricant 128 such as graphite as shown in Figure 10, or its equivalent, to provide for lubrication of the engaging wall surfaces of the piston members and cylinder without impairing the ability of the grooves to function as a seal.

In rotary engines it has been found essential that the spark for igniting the combustible mixture between cooperating pistons of the piston members take place as close to the cylinder wall as possible, and that the recess in the cylinder wall for the spark electrodes be as small and shallow as possible.

If an ordinary deep recess in the cylinder wall is provided it acts to retain a considerable quantity of combustion gases at high pressure therein which never become expelled from the spark cavity. The accumulation of burnt gases in the spark cavity has an insulating effect on the spark and limits its effectiveness. Loss of efficiency obviously results from such conditions.

It should also be noted that any entrapment of burnt gases in the spark recess at high pressure tends to force the combustible mixture in the spaces between pistons at less pressure and brought to the sparking position for firing away from the spark to seriously limit its contact therewith. This accounts for the "missing" oftentimes experienced with rotary engines.

Another objection of the conventional large size and deep recess for spark electrodes in rotary engines is that they allow the escape of combustion gases past the pistons despite the presence of sealing strips or other sealing means thereon.

In the present invention the spark cavity in the cylinder wall is made extremely small and shallow and the spark plug is of special design employing an improved type of ground electrode separate from the spark plug shell and which of itself acts to substantially close the entire spark recess at the inner wall of the cylinder.

For this purpose the cylinder head is provided with a threaded hole 130 opening to the exterior of the cylinder head but terminating short of the cylinder wall and which is communicated with the interior of the cylinder through a relatively narrow slot 131 as shown in Figures 11 and 13. The slot 131 may be rectangular in shape as shown in Figure 13 with its long dimension extending in the direction of the cylinder axis indicated by the broken line 132 so that the pistons sweep across the narrow dimension of the slot.

The narrow dimension of the slot should be less than the width of the sealing strip conventionally used on the pistons of rotary engines to preclude the escape of combustion gases past the strip when the same aligns with the slot.

The spark plug generally indicated by the numeral 51 is of special construction in that it does not have the customary ground electrode carried as a unitary part thereof. The ground electrode or electrodes 133 in the present invention are carried by an annular ring 134 of a size to fit in the bottom of the threaded hole 130 where it is maintained in position by the threaded end portion 135 of the spark plug shell 136.

The diametrically opposite electrodes 133 may be formed integrally with the ring 134, in which case the ring is made of high tungsten steel, and are bent downwardly out of the plane of the ring toward the inner wall of the cylinder to lie adjacent to the ends of the slot as at 137. At points directly adjacent to the inner wall of the cylinder the electrodes are directed radially inwardly as at 138 to have their inwardly directed ends terminate closely adjacent to the sides of the center electrode 139 extending centrally through the customary porcelain insert 140 of the plug.

Hence, the spark for the cylinder takes place as close to the inner wall of the cylinder as possible, there being only the necessary clearance provided for rotation of the pistons past the ground and central electrodes.

It is also desired to point out that the electrodes 133 act to substantially close the slot 131 which is open only at the spark gap between the ends of the electrodes and the center electrode 139.

The lower hollow end of the plug may be substantially filled by the lower end of the porcelain insulator which is preferably sealed as close to the lower end of the threaded portion 135 of the shell as possible. In the present instance, the lower tip of the insulator is of only slightly reduced diameter as shown in Figure 11 and joins with a larger diameter of the insulator directly thereabove by means of a beveled surface 141 which in turn is seated on a beveled seat 142 extending about the interior of the hollow shell at the threaded end thereof.

The cavity in the bottom of the plug, therefore, is extremely shallow and restricted by the insulator, and in the event any combustion gases enter the same through the restricted spark gap, the pressure of such gases is lowered to a point where they do not interfere with the ignition of a combustible mixture by their escape from the cavity.

The construction described thus insures the presence of a spark directly adjacent to the inner wall of the cylinder and contact of such spark with the combustible mixture.

When the ground electrode is formed of high tungsten steel as described, the plug is preferably sealed by means of a conventional soft copper washer 144 interposed between the cylinder head at the mouth of the threaded hole and a shoulder 145 at the inner extremity of the threaded portion 135 of the plug. The placing of the seal at this location is not critical inasmuch as the seal may be placed between the ring 134 of the ground electrode and the end of the threaded portion 135 of the plug so that sealing takes place directly adjacent to the electrode itself.

In Figures 14 and 15, a modified type of ground electrode is shown. With this ground electrode the threaded hole 130 for the plug is communicated with the interior of the cylinder through an aperture 146, the walls of which are conical with the smallest diameter thereof at the inner wall of the cylinder and the large diameter opening to the threaded hole 130 for the plug.

In this case, the diametrically opposite ground electrodes 147 are welded to the inner periphery of a soft copper annular sealing ring 148 and extend downwardly and inwardly toward the small diameter opening to the recess 146 to lie along the walls thereof as shown in Figure 14. These electrodes would likewise be formed of high tungsten steel and terminate directly adjacent to the inner surface of the cylinder wall in closely spaced relationship to the sides of the center electrode 139 so as to provide a spark gap at either side of the center electrode.

The provision of this type of spark recess has the effect of further decreasing the size of the cavity and the entrance thereto with consequent limiting of the amount of combustion gases which may become entrapped therein.

From the foregoing description taken in connection with the accompanying drawings, it will be readily apparent to those skilled in the art that this invention provides a drive transmission for rotary engines by which extremely smooth and balanced operation of the engine is achieved; that the sealing means of this invention results in substantial improvement not only in the manner of sealing the pistons in their cylinder but in allowing accurate fitting thereof for rotation in the cylinder with extremely close tolerances; that cooling of the piston members in the novel manner described precludes the possibility of overheating of the pistons; and that the improved manner of providing spark for the engine prevents the possibility of the engine "missing" and enables full utilization of the combustible mixture acted thereon.

What we claim as our invention is:

1. A piston member for rotary engines characterized by the fact that the piston member is of hollow construction being closed at its hub portion by a relatively thin circumferential wall formed of helical convolutions extending axially of the hub.

2. A piston member for rotary engines characterized by the fact that the piston member is hollow and closed at its hub portion by a relatively thin circumferential wall formed to provide an axially extending helically shaped passageway the ends of which open to the bore of the hub adjacent to the ends of the hub.

3. A piston member for rotary engines characterized by the fact that the piston member is hollow and closed at its hub portion by a relatively thin circumferential wall formed of helical convolutions extending axially of the hub, and further characterized by the presence of a vaporizable coolant sealed within the hollow interior thereof.

4. A piston member for rotary engines characterized by the fact that the piston member is of hollow construction and closed at its hub portion by a relatively thin circumferential wall formed to provide an axially extending helically shaped passageway, the ends of which open to the bore of the hub adjacent to the ends thereof, and further characterized by the presence of a small amount of vaporizable coolant sealed within the hollow interior thereof.

5. A piston member for rotary engines, comprising: a hollow barrel-like hub having cylindrical wall surfaces at its bore; diametrically opposite hollow sector-like pistons on the hub with their interiors communicating with the interior of the hub; and a circumferential wall inside the hub for closing the same at its bore and cooperating with said cylindrical wall surfaces thereof to define an enclosed axially extending passageway the ends of which lie adjacent to the ends of the hub and communicate with the bore of the hub through apertures in said cylindrical wall surfaces of the hub.

6. A piston member for rotary engines comprising: a hollow barrel-like hub having cylindrical wall surfaces at its bore; diametrically opposite hollow sector-like pistons on the hub with their interiors communicating with the interior of the hub; a circumferential wall inside the hub for closing the same at its bore and cooperating with said cylindrical wall surfaces thereof to define an enclosed axially extending passageway the ends of which lie adjacent to the ends of the hub and communicate with the bore of the hub through apertures in said cylindrical wall surfaces of the hub and through which a cooling medium is adapted to be circulated; and a coolant inside the hollow piston adapted to be vaporized upon contact with the portions of the pistons which become heated during operation of the engine and adapted to be condensed by its contact with said circumferential wall so that such condensed coolant is continuously thrown against heated surfaces of the pistons during rotation thereof in the engine to exert a cooling effect on said heated surfaces.

7. Means for cooling a hollow rotatable member having surfaces remote from its axis of rotation subject to intensive heating, comprising: circumferentially disposed means lying radially between said remote surfaces and the axis of rotation of said member providing a passageway through which a cooling medium is adapted to be circulated, one wall of said passageway being exposed on the hollow interior of said member; and a vaporizable coolant inside the hollow member adapted to be condensed and projected radially outwardly by said wall of the passageway as the result of centrifugal force during rotation of said member to impinge said heated remote surfaces and adapted to be vaporized by contact with said heated surfaces and recondensed upon recontacting said wall of the passageway with vaporization and condensing occuring continuously in an endless cycle.

ROBERT P. McCULLOCH.
JOHN L. RYDE.
AUSTIN GUDMUNDSEN.

REFERENCES CITED

The following references are of record in the file of this patent:

UNITED STATES PATENTS

| Number | Name | Date |
|---|---|---|
| 1,326,810 | Violet | Dec. 30, 1919 |
| 1,462,855 | Gerleman | July 24, 1923 |
| 1,603,630 | Morris | Oct. 19, 1926 |
| 1,848,065 | Rabezzana | Mar. 1, 1932 |
| 2,027,179 | Lack | Jan. 7, 1936 |
| 2,085,505 | Murakami | June 29, 1937 |
| 2,088,779 | English | Aug. 3, 1937 |
| 2,125,434 | Eplett | Aug. 2, 1938 |
| 2,147,290 | Gardner | Feb. 14, 1939 |
| 2,211,292 | Ryerson | Aug. 13, 1940 |
| 2,291,243 | Lévy | July 28, 1942 |